(No Model.)
E. THOMSON.
METHOD OF ELECTRIC WELDING.
No. 440,664.     Patented Nov. 18, 1890.
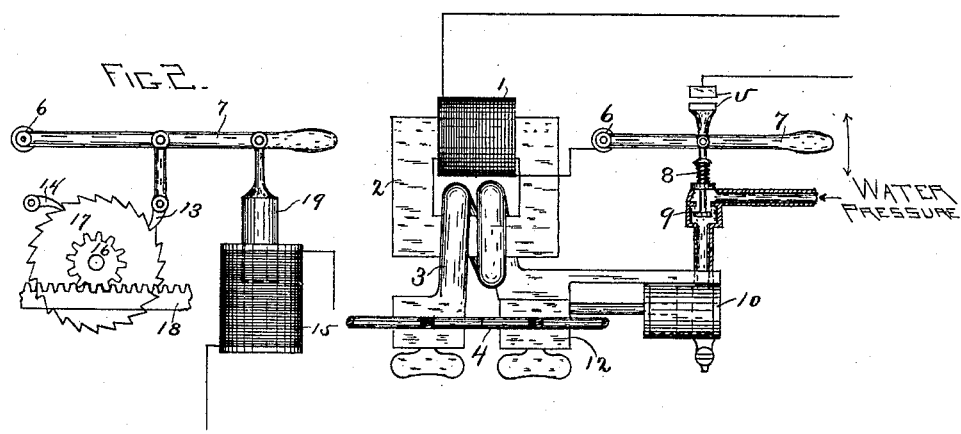
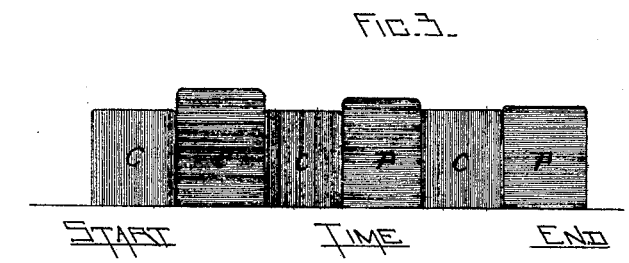
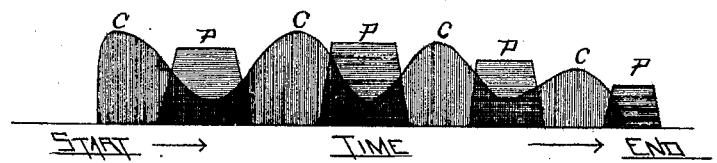
WITNESSES
INVENTOR
Elihu Thomson
By H. C. Townsend
Atty.

UNITED STATES PATENT OFFICE.

ELIHU THOMSON, OF LYNN, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 440,664, dated November 18, 1890.

Application filed May 15, 1888. Serial No. 273,987. (No model.)

*To all whom it may concern:*

Be it known that I, ELIHU THOMSON, a citizen of the United States, and a resident of Lynn, in the county of Essex and State of Massachusetts, have invented a certain new and useful Method of Electric Welding, of which the following is a specification.

My invention relates to welding metals by the agency of electricity; and it consists, essentially, in the repeated application alternately of a heating electric current and pressure to the pieces to be welded.

My invention may be carried out by the use of any desired form of apparatus and by heating electric currents of the proper volume derived from any desired source.

Apparatus which may be employed for the purpose is described in my prior patents, Nos. 347,140, 347,141, and 347,142.

My invention may be practiced as follows: The pieces or objects to be welded having been placed in the conducting-clamps of the apparatus and in contact with one another, but without any considerable pressure, a heating electric current of moderate volume is passed through them and allowed to flow for a greater or less time, according to the size of the pieces and according to the number of alternations of current and pressure which it is desired to employ in completing the operation. The current is then entirely cut off or greatly reduced, so as to stop the increase of heat in the pieces, and mechanical pressure is applied to force the pieces more closely together. Such force being greatly diminished or entirely removed, the heating-current is again applied, and when the desired heating is secured is again removed or cut down and pressure again applied. In this manner the heating-current and pressure are alternately applied until the work is done. By this means a perfect weld is gradually effected if the operations have been carefully performed.

Figure 1 illustrates an apparatus which may be used in practicing my invention. Fig. 2 illustrates another form of apparatus which may be employed. Figs. 3 and 4 are graphical representations of the action of the apparatus shown in Figs. 1 and 2.

Referring to Fig. 1, 3 indicates the secondary, 2 the iron core, and 1 the primary, of any transformer adapted to convert alternating electric currents into currents of lower electro-motive force, but large volume suitable for heating the piece or pieces of metal 4 held in suitable clamps forming the terminals of the secondary. Clamp 12 is provided with suitable means for moving it parallel to the rods 4 and toward the opposite clamp. The means here shown are a piston which moves in a cylinder 10 and has its rod attached to the movable clamp 12. 9 is a valve in a water-pressure-supply pipe leading through the cylinder 10. 8 is a spring which tends to counteract the weight of the parts operating the valve—such as lever 7—and the valve itself. Lever 7 is pivoted at 6 and carries one of two contacts 5, which, when in connection, close the circuit of the primary 1.

The apparatus is used as follows: The lever 7 being held upward, current flows and the metal 4 begins to soften. The lever is then depressed to stop the current and open the valve, admitting pressure to the piston, so as to force the metals together. The lever is then again held upward and current allowed to flow, while the pressure is discontinued through the closure of the valve. This is repeated as often as desired, current and pressure being used alternately, as graphically represented in Fig. 3, where C indicates current and P pressure.

Fig. 2 indicates an apparatus wherein the alternating current and pressure may be applied without entirely cutting off the current during the application of pressure. 15 is a reactive coil, which may be placed in the circuit of a primary, and is provided with a movable core 19, the depth of insertion of which in the coil 15 determines the reactive kick or resistance of the latter, as well understood in the art. Core 19 is operated by means of a lever 7, pivoted at 6 and carrying a pawl 13, which serves to rotate a wheel 17 step by step. 16 is a pinion carried by wheel 17 and meshing with a rack 18, by which movement and pressure may be imparted to the work. As the lever is moved down to move the core 19 and decrease or tend to stop the current, the pressure is applied by means of the pawl 13.

On movement in the opposite direction, which removes the pressure, the current is increased and the heating takes place. This operation is practically the same as in Fig. 1, excepting that the current is gradually kicked back instead of entirely discontinued.

Fig. 4 illustrates graphically the manner in which the current and pressure overlap. In both cases it will be observed that there is an alternate application of heating-current and welding-pressure, as before described.

What I claim as my invention is—

The herein-described method of electric welding, which consists in the repeated alternate application of a heating electric current and pressure to the object to be welded.

Signed at Lynn, in the county of Essex and State of Massachusetts, this 11th day of May, A. D. 1888.

ELIHU THOMSON.

Witnesses:
J. W. GIBBONEY,
F. R. HILL.